United States Patent [19]

Boutmy et al.

[11] 4,187,415
[45] Feb. 5, 1980

[54] REMOTE LOCATING SYSTEM FOR TRANSMISSION FAULTS IN DATA TRANSMISSION LINE HAVING REGENERATIVE REPEATERS

[75] Inventors: Patrick E. Boutmy; Jean-Marc A. Camborde, both of Lannion, France

[73] Assignees: Etat Francaise, Issy-les-Moulineaux; Societe Anonyme de Telecommunications, Paris, both of France

[21] Appl. No.: 912,727

[22] Filed: Jun. 5, 1978

[30] Foreign Application Priority Data

Jun. 20, 1977 [FR] France ................. 77 18879

[51] Int. Cl.² .......................................... H04B 3/46
[52] U.S. Cl. ........................................ 179/175.3 F
[58] Field of Search .......... 179/175.3 F, 175.31, 179/175.3 R, 15 BF

[56] References Cited

FOREIGN PATENT DOCUMENTS 2134783 2/1973 Fed. Rep. of Germany ... 179/175.31 R

Primary Examiner—Bernard Konick
Assistant Examiner—Joseph A. Popek
Attorney, Agent, or Firm—Abraham A. Saffitz

[57] ABSTRACT

A remote locating system for remote locating the pairs of regenerative repeaters of a bidirectional data transmission line which is interconnected between a monotoring station and a monitored station. The monitoring station comprises a first low frequency generator which generates a first low frequency signal on the forward line channel which is continuously transmitted in the forward direction from the monitoring station to the monotored station in response to the fault detection on the line and a second low frequency generator which generates a second low frequency signal on the backward line channel which is transmitted in the forward direction after the transmission beginning of the first signal. The second signal is modulated by successive pulses, each of which identifies a regenerative repeater pair. The first signal is simultaneously detected in each forward transmission regenerative repeater and controls the connection of the output and the input of the forward and backward transmission regenerative repeaters of each pair. In the backward transmission regenerative repeater of each pair the pulse which identifies the next pair, is detected for connecting the input and the output of the backward regenerative repeaters of the pair and the next pair and for disconnecting the regenerative repeaters of the pair. The first and second low frequency signals are mixed with a digital testing signal which is transmitted from the monitoring station through the connected pair and is monitored between two successive pulses so as to detect the transmission faults of the connected pair or the connected line section.

5 Claims, 4 Drawing Figures

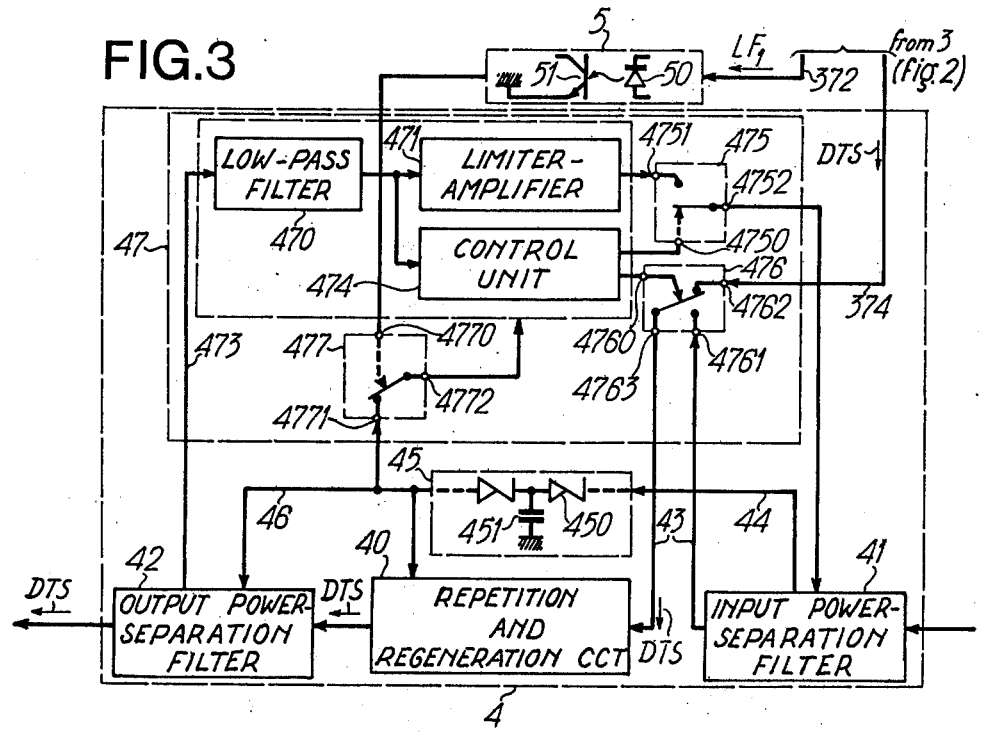
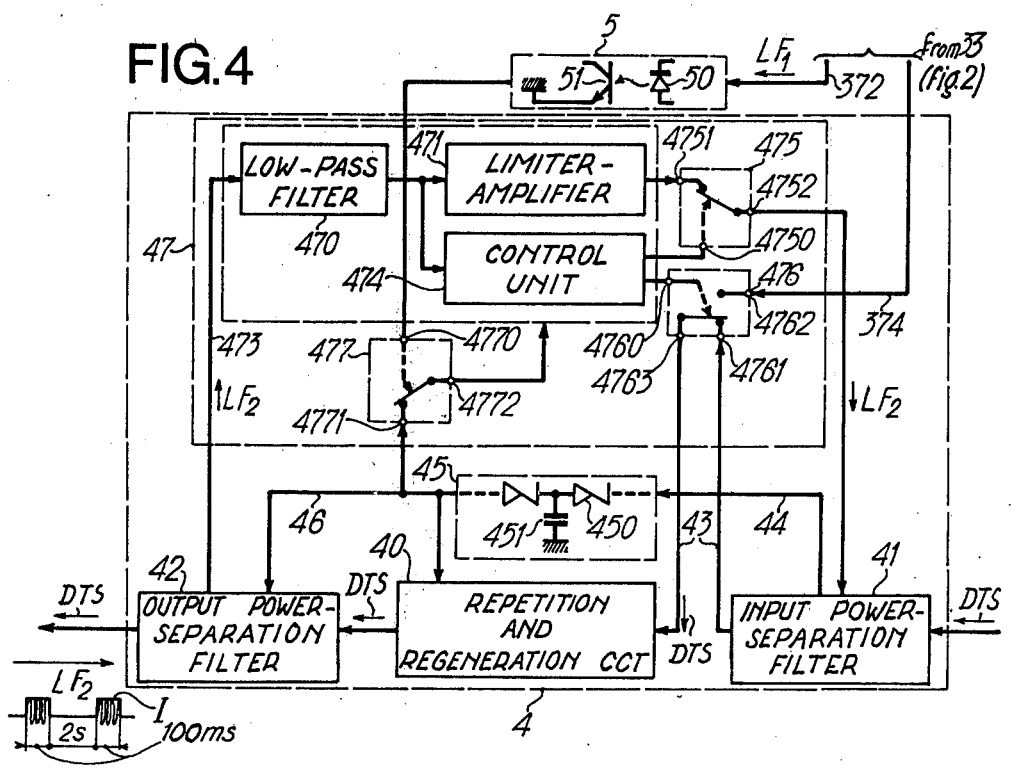

REMOTE LOCATING SYSTEM FOR TRANSMISSION FAULTS IN DATA TRANSMISSION LINE HAVING REGENERATIVE REPEATERS

CROSS REFERENCES TO RELATED APPLICATIONS

Applicants hereby make cross references to their French Patent Application No. PV 77-18879, filed June 20, 1977 and claim priority thereunder following the provisions of 35 U.S.C. 119.

BACKGROUND OF THE INVENTION

1. Field of the Invention

The invention relates to a remote locating system for remote locating intermediate devices in an analog or digital transmission line and for remote detecting at least one fault which interrupts the normal data transmission along the line. More specifically, the invention relates to the remote location of pairs of regenerative repeaters which cause an unacceptable operation in an interconnected transmission line between a monitoring station and a monitored station.

2. Description of the Prior Art

Hereinafter, we shall refer to a multiplex data transmission line which transmits digital signals at a predetermined rate. These digital signals are obtained from time-division multiplexing a given number of data digital component signals. The transmission line is bidirectional and comprises an unidirectional forward transmission channel which transmits a data digital signal from the monitoring station to the monitored station and an unidirectional backward transmission channel which transmits another data digital signal from the monitored station to the monitoring station. The forward and backward transmission channels of the line are made up of line sections which are interconnected by pairs of regenerative repeaters, each of which comprises a pair of cables such as coaxial cables. The data transmission in one direction is independent of the condition of the channel in the other direction.

During normal operation, the remote and monitored stations supply the regenerative repeaters on the forward and backward channels, monitor the quality of data digital transmission along the forward and backward channels and perform the analysis of the features of the transmission line. These features are free from noise, which is determined when the error rate is below a given threshold, and continuous routing of the data transmission. As soon as the monitoring station of the monitored station has detected a fault such as an unacceptable feature, the station produces an alarm signal which warns the monitoring station operator than a fault on the data transmission line must be remote-located.

Usually, fault detection is equivalent to remote-locating the pairs of regenerative repeaters in succession, starting from the monitoring station. In this end, the monitoring station comprises supervisory and control equipment which is controlled by the operator and connected to the transmission terminal of the monitoring station in order to supervise the transmission of remote-locating signals and digital testing signals. The supervisory equipment, which monitors and analyses the transmission features of the line, is also used to eliminate local faults in the data transmission line.

In the prior-art methods, a pair of regenerative repeaters is remote located by the supervisory and control equipment in the monitoring station which remote-controls the connection or looping of the output of the regenerative repeater of each pair which is associated with the forward transmission channel to the input of the regenerative repeater of the pair which is associated with the backward transmission channel. Thus, a digital testing signal is transmitted from the monitoring station via a given number of regenerative repeaters which are associated with the forward transmission channel, is routed through the pair of aforementioned regenerative repeaters and is transmitted to the monitoring station by the same given number of regeneration repeaters which are associated with the backward transmission channel. Some features of the received digital testing signal are analysed to show whether all the pairs of regenerative repeaters preceding the looped regenerative repeater pair operate properly. The analysis indicates the faulty regenerative repeater pair and facilitates the return to normal operation and the maintenance of other faulty pairs of regenerative repeaters by measuring the error rates and the frequency shifts.

During maintenance, the digital testing signal may be a pseudo-random signal transmitted from the transmission terminal of the monitoring station. The group propagation time of the testing signal, which is rounded through a looped regenerative repeater pair, is measured so as to indicate the length of the set of line sections which is monitored. In addition, the test information which is transmitted from the terminal of the monitored station to the supervisory and control equipment of the the monitoring station are used to locate a complete breackdown, such as a break in the transmission line or a high error rate.

Remote-locating systems of this kind are disclosed in certain articles of the French periodical "Cables & Transmission", December 1975.

On pages 174 through 183 of the aforementioned periodical, Y. Samoel describes a remote-locating system for remote-locating faults on a multiplex digital transmission line at 2.048 Mbits/s rate. In order to remote locate a pair of regenerative repeaters, this system uses an additional pair of cable sections which are interconnected to six pairs of regenerative repeaters and transmit a suitable direct current, which is cut N times in order to locate and loop the $N^{th}$ pair of regenerative repeaters. Each transmitted current loops one pair of regenerative repeaters and each current cut-off unloops the previously looped pair of regenerative repeaters. The number of cut-off in the d.c. supply indicates the address of the pair of located regenerative repeaters.

In this system, each pair of monitoring and monitored stations has to be associated with a pair of cable sections which are used only for remote location, and therefore, are under-used.

To avoid this disadvantage, J. P. Prigent, G. Le Fort and D. Betoule describe, on pages 434 through 456 of the aforementioned periodical, a system for remote-locating regenerative repeaters which are interconnected on a multiplex digital transmission line at 51.747 Mbits/s. This system does not use an additional transmission link which transmits the remote locate controlling signals, but only the coaxial cables which transmit, in normal operation, the data digital signals along the forward and backward channels.

To this end, the remote supply current for the forward channel, which travels the center conductor of the corresponding coaxial cable, is reversed at the beginning of the remote-locating operation. As a result of the inversion, all the pairs of regenerative repeaters in the transmission line are looped and the first pair of regenerative repeaters, which is the nearest pair to the monitoring station, is remote-located. Next, a signal at a predetermined low frequency is transmitted in the forward direction on the backward channel and unloops the first pair of regenerative repeaters and simultaneously loops the second pair of regenerative repeaters, which is then located. The process is repeated in succession, so that the number of the low-frequency signal transmissions indicates the address of a determined pair of regenerative repeaters.

In order to restore the normal operating conditions of the transmission line, the remote supply current is inverted a second time. The second inversion, however, must be preceded by the transmission of a signal which controls the inversion of the remote supply current from the monitoring station to the monitored station.

Furthermore, since the remote supply of the regenerative repeater pairs is limited by its range in accordance with the aforementioned remote-location method, order signals are transmitted necessarily before each current inversion, at the beginning and the end of remote location, not only to the monitoring station but also to the intermediate equipment in the transmission line which performs the remote supply of a regenerative repeater pair group. This intermediate equipment is needed for providing the d.c. supply which is attenuated during transmission along the transmission line. Consequently, in this remote locating system, the range of the remote locating signals is identical with the remote supply range, which means that pairs of regenerative repeaters cannot be remote located if the transmission line is more than 100 km approximatively.

OBJECTS OF THE INVENTION

The principal object of the present invention is to provide a remote locating system for remote locating regenerative repeaters in a data transmission line irrespective of the length of the transmission line.

Another object of the invention is to provide a remote locating system which transmits remote locating signals on the data transmission line which are irrespective of the features of the data transmission signals and are mixed with the data transmission signals.

A further object of the invention is to provide a remote locating system which transmits data testing signals on the data transmission line which are automatically monitored during remote location operations and maintenance operations.

Yet another object of the invention consists of the construction of a regenerative repeater pair which has a low direct current consumption and the whole of its component circuits of which can be monitored.

SUMMARY OF THE INVENTION

According to the invention, a remote locating system remote locates the N pairs of regenerative repeaters which are interconnected by line sections of a bidirectional data transmission line which is interconnected between a monitoring station and a monitored station, said bidirectional data transmission line comprising;

a forward transmission channel conveying in the forward direction from said monitoring station to said monitored station a first data signal; and a backward transmission channel conveying in the backward direction from said monitored station to said monitoring station a second data signal; said monitoring and monitored stations comprising;

first and second means for detecting transmission faults on said backward and forward transmission channels respectively; and first and second means for producing first and second alarm signals in response to the detection of a transmission fault on said backward and on said forward transmission channels, respectively; said monitoring station also comprising;

a first means for continuously generating a first low frequency signal in said forward direction on said forward transmission channel in response to said first alarm signal, said first low frequency being mixed with said first data signal, and a second means for generating a second low frequency signal in said forward direction on said backward transmission channal after said first low frequency signal is produced, said second low frequency signal being modulated by at most (N−1) pulses and being mixed with said first data signal on said backward transmission channel when the forward transmission regenerative repeater of a pair is connected to the backward transmission regenerative repeater of said pair;

said forward transmission regenerative repeater of each said regenerative repeater pair comprising:

means for detecting said first low frequency signal; and means for transmitting said first low frequency signal on said forward transmission channel to the next forward transmission regenerative repeater;

said backward transmission regenerative repeater of each said regenerative repeater pair comprising:

means for detecting a first pulse of said second low frequency signal which is transmitted from the preceding backward transmission regenerative repeater in said forward direction on said backward transmission channel;

means for connecting the output terminal of said forward transmission regenerative repeater of said pair to the input terminal of said backward transmission regenerative repeater of said pair in response to said detection of said first low frequency signal by said first low frequency signal detecting means, and thereby obtaining the disconnection between said input terminal of said backward transmission regenerative repeater of said pair and the output terminal of the backward transmission regenerative repeater of the next pair;

means for disconnecting said output terminal of said forward transmission regenerative repeater of said pair from said input terminal of said backward transmission regenerative repeater of said pair in response to said detection of said first pulse of said second low frequency signal by said first pulse detection means, and thereby obtaining the connection of said input terminal of said backward transmission regenerative repeater of said pair and said output terminal of said backward transmission regenerative repeater of said next pair; and means for transmitting in said forward direction on said backward transmission channel to said output terminal of said backward transmission repeater of said next pair, only the pulses of said second low frequency signal which succeed said detected first pulse.

The monitoring station is under the local control of the operator and is used to bring about at least the following two possible automatic sequences:

(1) Maintenance operation of the data transmission line. As soon as an alarm signal is produced from one of said first and second alarm signal producing means, the operator triggers an automatic sequence for remote locating one or more faulty regenerative repeater pairs. The first stop of the second low frequency signal transmission occurs when an alarm signal is again produced and therefore corresponds to the first faulty regenerative repeater pair which is the nearest pair to the monitoring station. If the first and second alarm signals are produced, it is the forward transmission regenerative repeater or the forward transmission channel section of the faulty pair which is faulty. On the contrary, if the first alarm signal is only produced, it is the backward transmission regenerative repeater or the backward transmission channel section which is faulty.

(2) Monitoring operation of a predetermined regenerative repeater pair i ($1 \leq i \leq N$) or the corresponding transmission line section. The operator triggers an automatic sequence of remote monitoring operation which comprises the transmission of said first low frequency signal and the transmission of $(i-1)$ pulses of said second low frequency signal.

An advantage of this remote locating system comprises the fact that the stop of the first low frequency signal transmission from said first generating means controls the remote supply of said connecting means, said disconnecting means and said transmitting means of said backward transmission regenerative repeaters so as to obtain the disconnections between said forward and backward transmission channels in all said pairs.

The foregoing and other objects, features and advantages of the present invention will become apparent from the following more particular description of the preferred embodiment of the invention as illustrated in the accompanying drawing.

BRIEF DESCRIPTION OF THE DRAWING

FIG. 3 is a block diagram of the backward transmission regenerative repeater in which the switches are in a state corresponding to the connection or looping of the forward and backward regenerative repeaters of the pair; and FIG. 4 is a block diagram analogous to the FIG. 3 in which the switches are in a state corresponding to the connection of the forward and backward regenerative repeaters of a next pair, through the monitoring stations.

DESCRIPTION OF THE PREFERRED EMBODIMENT

Figure 1:
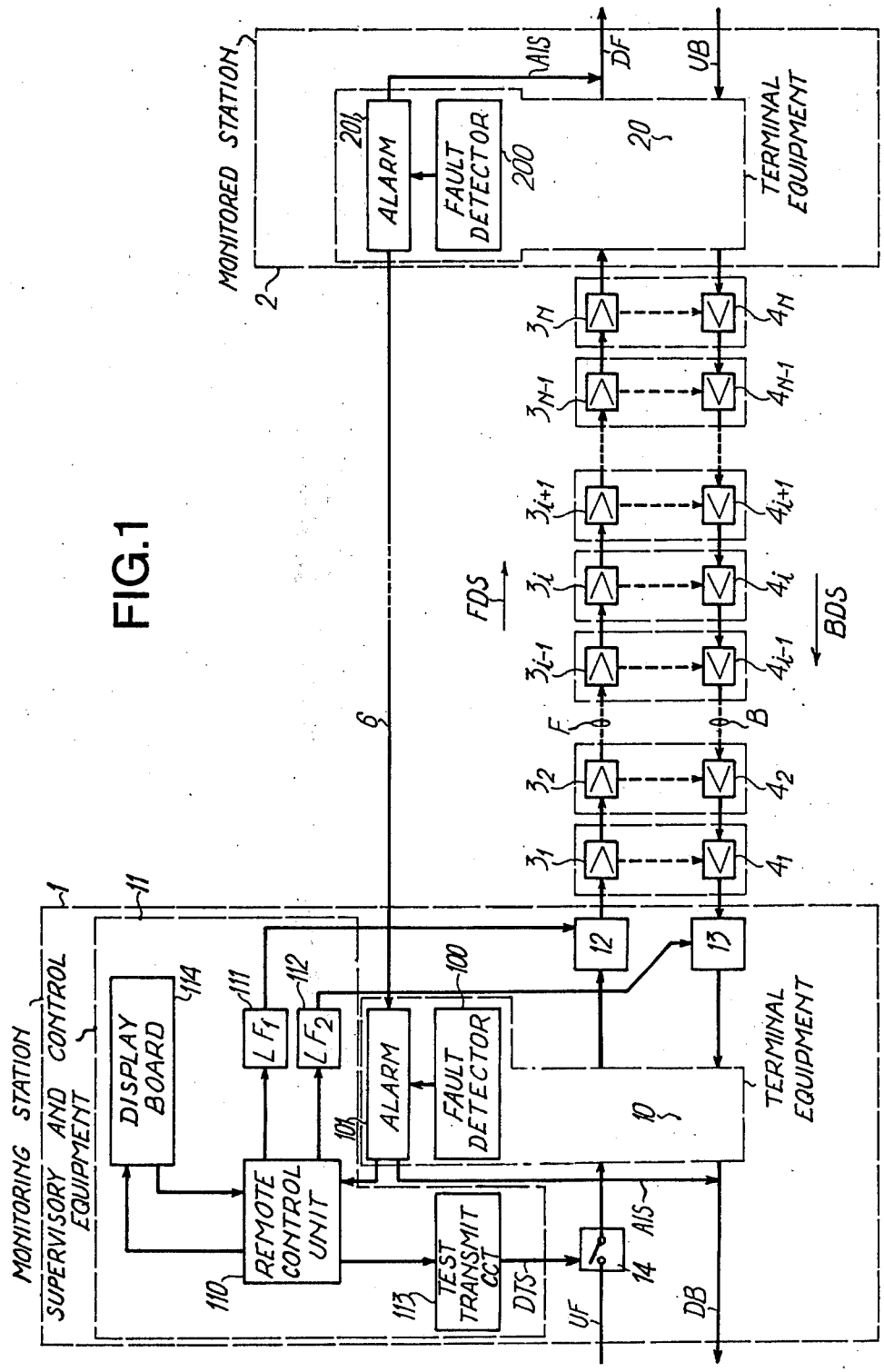
FIG. 1 is a schematic block diagram representing the remote locating system of a digital data transmission line embodying the invention.

Referring first to FIG. 1, the schematic structure of a data digital transmission between a monitoring station 1 and a monitored station 1 is illustred. The bidirectional digital transmission line F-B is made up of a unidirectional forward transmission channel and a unidirectional backward transmission channel.

Each station 1 or 2 is connected at one of the ends of the transmission line F-B which comprises pairs of cable sections F and B, each of which being interconnected to two pairs of regenerative repeaters $3_i$, $4_i$ and $3_{i+1}$, $4_{i+1}$. Each cable section F is included in the forward transmission channel and transmits a multiplex data digital signal FDS from the monitoring station 1 to the monitored station 2. Each cable section B is included in the backward transmission channel and transmits another multiplex data digital signal BDS from the monitored station 2 to the monitoring station 1. Each station 1 or 2 comprises a terminal equipment 10 or 20 which receives the signal FDS or BDS from an upstream forward transmission channel UF or an upstream backward transmission channel UB. The upstream multiplex data digital signal FDS or BDS which is obtained from the time division multiplexing unit, is transmitted, after timing, phasing in the monitoring or monitored station, on the forward or backward transmission channel of the transmission line F-B. Inversely, each terminal equipment 10 or 20 receives from the monitored station 2 or the monitoring station 1 the multiplex data digital signal BDS or FDS which is transmitted on the forward or backward transmission channel of the transmission line F-B, and transmits this last data multiplex digital signal BDS or FDS on a downstream backward transmission channel DB or a downstream forward transmission channel DF to a demultiplexing unit. Each terminal equipment 10 or 20 comprises in known manner a circuit which shapes the multiplex data digital signals, such as code converters which convert the binary-coded digital signals into encoded signals in line code and vice versa, two terminal regenerative repeaters which are inserted on the forward channel and the backward channel of the line F-B, respectively, and power supply bays which deliver direct current for remote supplying the circuits in the regenerative repeaters which are inserted in the forward and backward channels of the line F-B, respectively.

The regenerative repeaters $3_i$, $4_i$ of the forward and backward channels are distinct and associated in pairs between each two sections of the transmission line B-F. FIG. 1 shows N pairs of regenerative repeaters $3_1$, $4_1$ through $3_N$, $4_N$ which are numbered in the forward transmission direction of the multiplex data digital signal FDS.

Each regenerative repeater $3_i$ or $4_i$ amplifies and equalizes the received digital signal FDS or BDS which is attenuated from transmission through the preceding forward or backward line section, performs shaping and phasing of the received signal pulses, and then provides the regenerated signal along the next line section.

Figure 2:
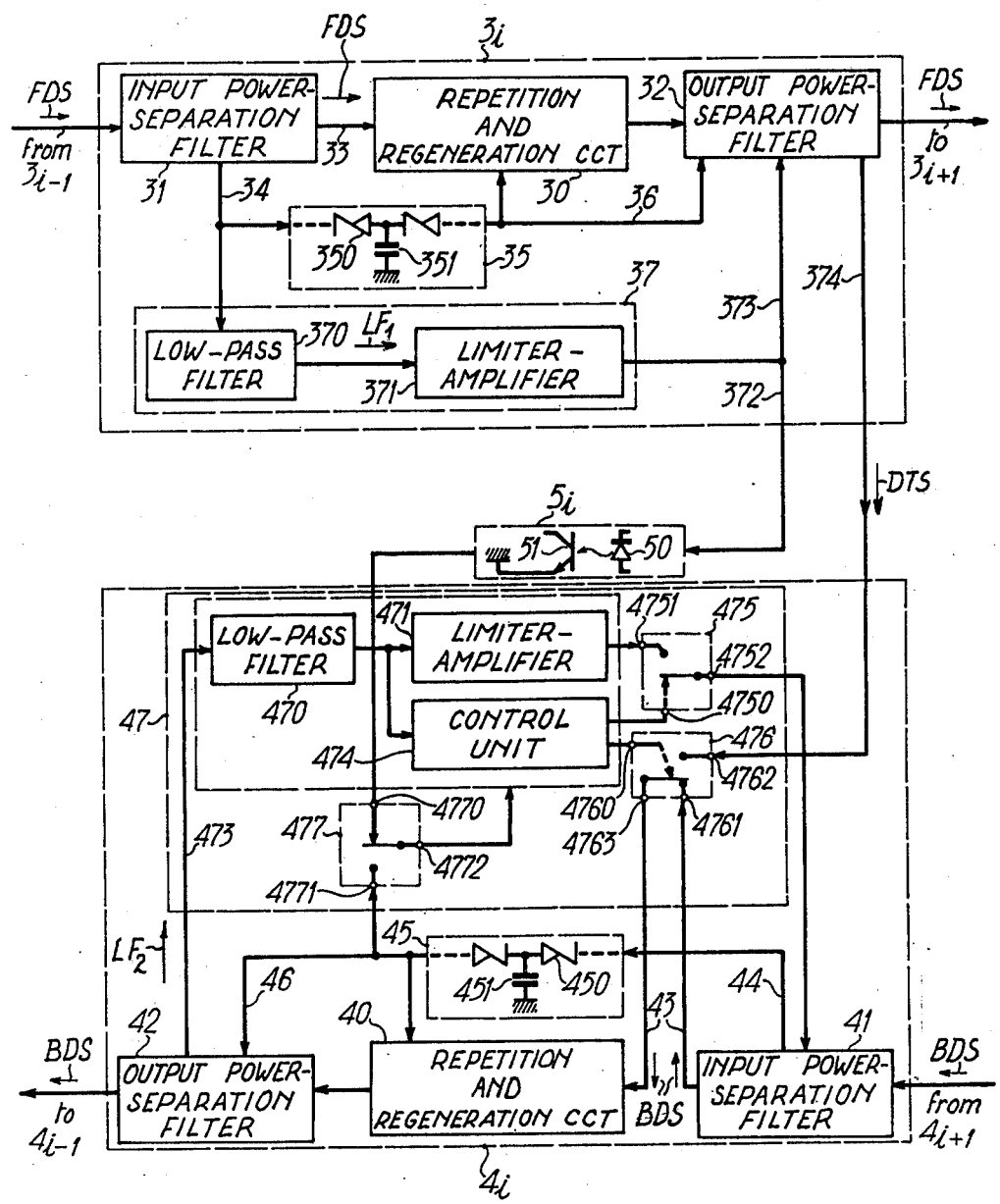
FIG. 2 is a block diagram of a pair of regenerative repeaters in which their switches are in the normal operating state.

These functions are performed by a repetition and regeneration circuit 30 in each regenerative repeater $3_i$ and by a similar circuit 40 in each regenerative repeater $4_i$ which are associated with the forward line channel and the backward line channel, respectively, as shown in FIG. 2. An input power separation filter 31 or 41 and an output power-separation filter 32 or 42 separate the data digital signals FDS and BDS from the direct-current transmitted by the power-supply bays. The data digital signal FDS or BDS is transmitted from the input filter 31 or 41 to the circuit 30 or 40 via a connection 33 or 43 and then, after shaping and phasing, is transmitted to the output filter 32 or 42. The supply d.c. is transmitted from the input filter 31 or 41 via a connection 34 or 44 to a supplying circuit 35 or 45 for supplying the various circuits of the regenerative repeater $3_i$ or $4_i$ and then is transmitted via a connection 36 of 46 to the output filter 32 or 42. Each supplying circuit 35 or 45 comprises two Zener diodes 350 or 450 the common connection point of which is connected to a reference voltage via a capacitor 351 or 451 which withstand high voltages. The current which is delivered by the preceding line section, supplies the circuits making up the regenerative repeater $3_i$ or $4_i$ and the subsequent regenerative repeaters $3_{i+1}$ through $3_N$ or $4_{i-1}$ through $4_1$.

The monitoring station 1 also contains a supervisory and control equipment 11 for remote locating regenerative repeaters, as shown in FIG. 1, and each regenerative repeater $3_i$ or $4_i$ comprises a remote-locate circuit 37 or 47, as shown in FIG. 2. The circuits 37 and 47 are different in that they are allocated to the forward line channel or the backward line channel.

With reference to FIG. 2, a remote locate circuit 37 in a regenerative repeater $3_i$, which is included in the forward line channel, comprises a low-pass filter 370 and an amplitude limiter-amplifier 371.

The low-pass filter 370 comprises a tuned transformer which detects a first low-frequency signal $LF_1$ on the connection 34. The signal $LF_1$ is transmitted by the monitoring station 1 when the station 1 has received an alarm signal indicating that a transmission fault has been detected in the forward line channel or the backward line channel. The low-frequency signal $LF_1$ is non-linearly amplified and its instantaneous amplitude is bounded in the limiter-amplifier 371, which transmits it (a) via a connection 372 to the regenerative repeater $4_i$ in order to connect or loop the regenerative repeaters $3_i$ and $4_i$ and (b) via a connection 373 to the output power-separation filter 32 in order to connect or loop the other pairs of regenerative repeaters $3_{i+1}$, $4_{i+1}$ through $3_N$, $4_N$ in the forward transmission direction. The output power-separation filter 32 comprises a high-voltage transformer which can transmit the digital testing signal DTS transmitted via a connection 374 to the connection 43 of the regenerative repeater $4_i$ when the pair of regenerative repeaters $3_i$, $4_i$ is looped.

The remote locate circuit 47 of the regenerative repeater $4_i$ which is included in the backward transmission channel, comprises, as the regenerative repeater $3_i$, a low-pass filter 470 and an amplitude limiter-amplifier 471. However, in the regenerative repeater $4_i$, the input terminal of the low-pass filter 470 is connected to an output terminal of the output filter 42 via the connection 473 and the output terminal of the limiter-amplifier 471 is connected to an input terminal of the input filter 41 via a switch 475.

During the unlooping operation, a second low-frequency signal $LF_2$ (FIG. 4) is transmitted from the monitoring station 1 on the forward transmission channel in the transmission direction opposite to the normal transmission direction for the data digital signal BDS. Next, the signal $LF_2$ is separated from the backward channel in the output filter 42, is detected by the low-pass filter 470 via the connection 473 and is then transmitted to the limiter-amplifier 471 and to a loop and unloop controlling unit 474. The unit 474 comprises a detector sensitive to the first pulse of the received signal $LF_2$, and also comprises a logic unit which controls the two-terminal switch 475 and a three-terminal switch 476. The supply of the logic unit depends on the presence of the first low-frequency signal $LF_1$ which is transmitted on the connection 372 from the regenerative repeater $3_i$ and which controls a supplying two-terminal switch 477. When the switch 477 is closed under control of the signal $LF_1$, the direct current which is transmitted by the supplying circuit 45 of the regenerative repeater $4_i$, supplies the loop and unloop controlling unit 474. The control orders of the unit 474 are dependent on both the first low-frequency signal $LF_1$ and the second low-frequency signal $LF_2$.

As shown in FIG. 2, the switches 475, 476 and 477 are illustrated in their normal operating state which corresponds to the transmission of data multiplex digital signals FDS and BDS on the forward and backward transmission channels of the transmission line F-B. The input terminal 4751 and the output terminal 4752 of the two-terminal switch 475 which comprises a control terminal 4750, are connected to the output terminal of the limiter-amplifier 471 and an input terminal of the input filter 41, respectively. The input terminals 4761 and 4762 of the three-terminal switch 476 which comprises a control terminal 4760, are connected to the data output terminal of the input filter 41 via the connection 43 and the output filter 32 via the connection 374, and the output terminal 4763 of the switch 476 is connected to the input terminal of the repetition and regeneration circuit 40 via the connection 43.

When the remote-locate circuit 37 does not transmit any low-frequency signal $LF_1$ on the connector 372 to the control terminal 4770 of the switch 477, the switch 477 is opened and the remote locate circuit 47 does not supply. As shown in FIG. 2, the connection 372 is connected by a coupler $5_i$ to the control terminal 4770 of the switch 477, which is open so that the remote supply current which is transmitted from the connection 46 to the input terminal 4771 of the switch 477, does not energize the control unit 474 via the output terminal 4772 of the switch 477. Under these conditions, the logic signals which are transmitted from the control unit 474 to the control terminals 4750, 4760 of switches 475, 476, are adapted to keep the open switch 475, which prevents any transmission of a low-frequency signal $LF_2$ between the limiter-amplifier 471 and the output power-separation filter 41, and to connect the input terminal 4761 and the output terminal 4763 of the switch 476, so that the digital signal BDS is normally transmitted on the backward channel via the input filter 41 and the repetition and regeneration circuit 40. The connection 374, which is connected to the output filter 32 of the regenerative repeater $3_i$, is closed at the input terminal 4762 of the switch 476 and the backward channel is disconnected from the forward channel of the transmission line, in the regenerative repeater pairs $3_i$, $4_i$.

The coupler $5_i$ performs galvanic coupling between the regenerative repeaters of the pair $3_i$-$4_i$ and comprises an opto-electronic coupler which is made up a photo-emission diode 50 and a phototransistor 51 which also rectifies the low-frequency signal $LF_1$ transmitted by the connection 372 to obtain a d.c. signal for controlling the switch 477.

In order to monitor the data multiplex digital signals FDS and BDS, each terminal equipment 10 or 20 of a station 1 or 2 comprises fault-detecting means as shown in FIG. 1, in addition to the previously-mentioned circuits.

The terminal equipments 10 and 20 comprise fault detectors 100 and 200 which detect transmission faults with regard to the signals FDS and BDS on the forward and backward transmission line channels F-R, respectively. An alarm transmitting circuit 101 or 201 is also included in the terminal equipment 10 or 20 and transmits an alarm signal when a corresponding transmission fault occurs.

A fault detector 100 or 200 monitors the data multiplexed digital signal BDS or FDS during predetermined periods, and energizes the associated alarm transmitting circuit 101 or 201 when at least one of the following transmission faults occurs:

the error rate is above a predetermined error rate, as found by checking the line code of the received multiplex data digital signal;

there is an absence of a multiplex data digital signal which corresponds to at least one cut-off in a line section and/or a defective operation of a component circuit of a regenerative repeater on the corresponding channel.

Only the monitoring station 1 controls the remote locate operations by means of the supervisory and control equipment 11. To this end, the alarm transmitting circuit 201 transmits the alarm signal which is determined by a fault on the forward line channel, to the alarm transmitting circuit 101 via an associated alarm transmission channel 6. Consequently, during the remote-locate operations, which are successive looping and unlooping operations of regenerative repeater pairs from pair $3_1$, $4_1$ to pairs $3_N$, $4_N$, an alarm signal is transmitted on the channel 6 when a fault is detected in the forward channel by the detector 200, whereas the fault detection signal is transmitted by the fault detector 100 only after the pair of regenerative repeaters which has produced the fault has been looped.

The remote-location can be controlled either manually or automatically. We shall now, with reference to FIG. 1, describe the circuits for automatic remote control, since the manual circuit can easily be deduced by the skilled addressee. In the latter case, the operations described hereinafter can be controlled by a push-button board.

An alarm signal which corresponds to at least one transmission fault on the transmission line F-B and which is delivered by the alarm transmitting circuit 101, is received by a remote control unit 110 which produces the various order sequences for a remote location operation according to a prerecorded program. The program is selected by the user from a group of programs which are used for remote locating one or more faults on the transmission line or for monitoring a predetermined pair of regenerative repeaters.

In all cases, the remote control unit 110, in accordance with a program of predetermined sequences of which two examples will be given hereinafter, energizes low-frequency generators 111 and 112. The first low-frequency generator 111 transmits in a continuous manner the first low-frequency signal $LF_1$, on the forward transmission line channel F in forward direction via a first output separation filter 12. The second low-frequency generator 112 transmits the second low-frequency signal $LF_2$ on the backward transmission line channel B in forward transmission direction via a second output separation filter 13. The low-frequency signals $LF_1$ and $LF_2$ can be thus mixed with the data multiplex digital signals FDS and BDS, respectively, and the emission of these data signals does not interrupt from the terminal equipments 10 and 20, respectively. If required, the remote control unit 110 energizes a generator 113 which transmits digital testing signals DTS instead of the digital signals FDS and BDS on the forward transmission line channel F via a switch 14 from the terminal equipment 10. Between the substantially simultaneous looping and unlooping of two successive pairs of regenerative repeaters, a predetermined duration elapses depending on the selected program and is sufficient inter alia for fault detection by the fault detector 100 and/or by the fault detector 200. Usually, the fault detector 200 of the monitored station 2 is disconnected after the beginning of a remote location operation, since the fault detector 100 in the monitoring station 1 will detect the indicated faults in all cases.

In order to avoid triggering a false alarm on the forward and backward transmission channels DF and DB downstream of the stations 2 and 1, two alarm indication devices which are included in the alarm transmitting circuits 101 and 201, transmit alarm indication signals AIS, after the fault detection, in the forward direction from the monitored station 2 and in the backward direction from the monitoring station 1, in order to disconnect the other stations or transmission devices downstream of the transmission line channels. The transmission of the first low-frequency signal $LF_1$ from the monitoring station 1 and the reception of this signal $LF_1$ into the monitored station 2 have the same effect on the transmission of the alarm indication signals AIS. This is for the purpose of maintenance in the absence of a fault.

The supervisory and control equipment 11 also comprises a display device and the board 114 which is connected to the remote control unit 110 so that the operator distinguishes the type of indicated fault, by means of light indicators, displays the number of the regenerative repeater pair to be automatically remote located in a monitoring operation by means of encoding wheels, and read on a display board the number of the failed pair or pairs of regenerative repeaters during a maintenance operation.

The operations which concern the looping and unlooping operations of the regenerative repeater pairs are described hereinafter. The first low-frequency signal $LF_1$ is continuously transmitted whereas the second low-frequency signal $LF_2$ is modulated by pulses such as 100 ms pulses which are separated by pulse spacings such as 2 s spacings which enable the analysis of the transmission features and the fault detections by means of the fault detectors 100 and/or 200. The low-frequency signals $LF_1$ and $LF_2$ are as sinusoidal signals at a frequency of 15 kHz.

We shall now assume that an alarm signal has been received by the remote control unit 110 and the regenerative repeater pairs are in the normal operation state as shown in FIG. 2.

The remote control unit 110 energizes the first generator 111 which transmits, through the input separation filter 12, the first low-frequency signal $LF_1$ in the forward direction across all the regenerative repeaters $3_1$ through $3_N$ to the monitored station 2.

This transmission controls the looping operation for all the regenerative repeater pairs, as shown in FIG. 3. In each regenerative repeater $3_i$, the remote-locate circuit 37 transmits the signal $LF_1$ on the connection 373 to the successive regenerative repeater $3_{i+1}$ in the forward direction. The coupler $5_i$ converts the first low frequency signal $LF_1$ into a direct current signal which is transmitted to the control terminal 4770 of the supply switch 477, which passes to the closed state. Since the input terminal 4771 and the output terminal 4772 are connected, the supplying circuit 45 supplies the direct current via the connection 46 to all the component circuits of the remote locate circuit 47. At the same time, the control unit 474 delivers signals which control the opening of the switch 475 through the control terminal 4750 and the connection of the input terminal 4762 and the output terminal 4763 of the switch 476 through the control terminal 4760. Since the input terminal 4761 of the digital channel 43 is disconnected from the output terminal 4763 of the switch 476, the digital output forward channel of the repetition and regeneration circuit 30 is connected to the digital input forward channel of the repetition and regeneration circuit 40 through the output power-separation filter 32, the connection 374 and the switch 476. On the other hand, each regenerative repeater $4_i$ is disconnected from the next regenerative repeater $4_{i+1}$ and only the repetition and regeneration circuits of the first regenerative repeater pair $3_1$, $4_1$ are connected across the monitoring station 1. The first pair $3_1$, $4_1$ is thus remote located and the transmission features of the first line section are analysed by detecting faults during the transmission of a normal digital signal FDS or a predetermined digital testing signal DTS.

If no fault is detected or if the alarm transmitting circuit 101 transmits no alarm signal to the remote control unit 110 as during a maintenance operation, a 100 ms pulse $I_1$ which modulates the low-frequency signal $LF_2$, is transmitted on the backward transmission line channel in the forward direction from the generator 112 via the output separation filter 13, after two seconds.

With reference to FIG. 4, the low pass-filter 470 in the regenerative repeater $4_1$ transmits the pulse $I_1$, which is suitably amplified and limited in the limiter-amplifier 471 and detected and recorded in the control unit 474. A capacitor in the detector of the control unit 474 is charged during the whole duration of the pulse $I_1$. When the pulse $I_1$ is recorded, the capacitor discharges. This discharge controls the closing of the switch 475 and the state changing of the switch 476 through the control terminals 4750 and 4760, respectively. The input terminal 4761 and the output terminal 4763 of the switch 476 in the regenerative repeater $4_1$ are again connected and the next regenerative repeater pair $3_2$, $4_2$ which remain in the preceding pre-looping state as shown in FIG. 3, are then looped across the first regenerative repeater pair $3_1$, $4_1$ to the monitoring station 1. During two seconds which succeed the first pulse $I_1$, the digital testing signal DTS or a digital signal FDS which is mixed with the first low frequency signal $LF_1$ on the forward transmission line channel, is monitored in the monitoring station so that the next line section which includes the regenerative repeater pair $3_2$, $4_2$ is tested. In this case, the digital testing signal DTS is transmitted by the output terminal of the output filter $3_1$ on the forward channel F of the next line section, travels the component circuits 31, 30 and 32 of the regenerative repeater $3_2$, the connection channel 374 of the pair $3_2$, $4_2$, the switch 476 and the component circuits 40, 42 of the regenerative repeater $4_2$ and is transmitted to the digital input terminal of the input power-separation filter 41 of the regenerative repeater $4_1$.

As long as the first low frequency signal $LF_1$ is transmitted on the connections 372 and hold the supply switches 477 at the closed state, the switch 475 of the regenerative repeater $4_1$ transmits the following pulses $I_2$ through $I_{N-1}$ of the second low frequency signal $LF_2$ which is mixed with the digital testing signal DTS on the backward transmission line channel. These pulses $I_2$ through $I_{N-1}$ control successively the looping operations of the next regenerative repeater pairs $3_3$, $4_3$ through $3_N$, $4_N$ as the preceding looping cycle, and the (N−2) next line sections are successively tested in the monitoring station 1.

During a remote-locate operation which concerns transmission failure, the successive regenerative repeater pairs are automatically or manually looped and unlooped until the fault detector 100 detects a first transmission fault which corresponds to the looping of defective regenerative repeater pair $3_i$, $4_i$ and to a transmission of the alarm signal which is delivered by the alarm transmitting circuit 101. In that case, the first generator 112 has transmitted (i−1) pulses $I_1$ through $I_{i-1}$ of the signal $LF_2$, which identify the address of the faulty pair or the faulty line section. This address and the fault type are displayed on the display board 114. Then, a test program of the defective pair and/or a program for remote locating any other faults on the next line sections which include the regenerative repeater pairs $3_{i+1}$, $4_{i+1}$ through $3_N$, $4_N$, is carried out as required by the operator.

If, for example, the alarm transmitting circuits 101 and 201 have each produced an alarm signal during the normal operation of the line F-B, the operator can search at least one transmission fault in the subsequent pairs of regenerative repeaters $3_{i+1}$, $4_{i+1}$ through $3_N$, $4_N$, using the same process of remote location as before.

The unlooping operation of the regenerative repeater pairs is controlled either by eliminating the first low frequency signal $LF_1$ or by transmitting all the pulses $I_1$ through $I_{N-1}$ of the second low frequency signal $LF_2$. In the first case, the elimination of the continuous transmission of the signal $LF_1$ results in each repeater $3_i$ in the elimination of the d.c. signal which controls the supply switch 477, which returns to the open state. Since the remote locate circuit 47 is no longer energized, the switch 475 returns to its normal open state as shown in FIG. 2 under control of state reversing of the logic signal which controls the control terminal 4750.

In a second example, the program of the remote control unit 110 concerns the remote locating of a predetermined regenerative repeater pair $3_i$, $4_i$ for a monitoring operation. In that case, the operator displays the address (i−1) by means of the encoded wheels of the display device 114, and the remote control unit 110 controls the continuous transmission of the first low frequency signal $LF_1$ from the generator 111 and only i−1 pulses $I_1$ through $I_{i-1}$ of the second low frequency signal $LF_2$ from the generator 112. After the selected pair $3_i$, $4_i$ has been remote located, the operator initiates the transmission of the digital test signals DTS so as to monitor the regenerative repeater pairs $3_i$, $4_i$, by means of the various detection signals of the fault detector 100 and/or detector 200, which are displayed on the display board 114.

During manual operation, the various aforementioned operations are brought about by separately controlling the following transmissions:
(1) the pre-looping signal $LF_1$;
(2) the unlooping signal $LF_2$;
(3) the digital test signals DTS, and
, then, the fault analysis by the fault detector 100 and/or detector 200 of stations 1 and 2 is required.

Although the aforementioned embodiment relates to a bidirectional digital transmission line of coaxial cable pair, a remote locating system embodying the invention can be advantageously used in other known kinds of connections which transmit data signals. The maintenance and monitoring operations concern not only regenerative repeaters but also intermediate transmission devices which are remote-located but not necessarily remote supplied by a monitoring station. In the case of a connection which transmits multi-frequency data signals, the frequencies of signals $LF_1$ and $LF_2$ are chosen outside the frequency spectrum of multi-frequency signals.

Further, a remote location system embodying the invention can also be used for remote locating the repeating and regenerating relay stations of a radio link. In that case, the local supply circuits of each relay station are used instead of the supplying circuits 35 and 45 which are described hereinbefore.

What we claim is:

1. A remote locating system for remote locating the N pairs of regenerative repeaters which are interconnected by line sections of a bidirectional data transmission line which is interconnected between a monitoring station and a monitored station, said bidirectional data transmission line comprising;
   a forward transmission channel, having forward transmission regenerative repeaters, conveying in the forward direction from said monitoring station to said monitored station a first data signal, and
   a backward transmission channel, having backward transmission regenerative repeaters, conveying in the backward direction from said monitored station to said monitoring station a second data signal; said monitoring and monitored stations comprising:
      means in each of said stations for detecting transmission faults on said backward and forward transmission channels; and
      means in each of said stations for producing first and second alarm signals in response to the detection of a transmission fault on said backward and on said forward transmission channels respectively; said monitoring station also comprising:
   a first means for continuously generating a first low frequency signal in said forward direction on said forward transmission channel in response to said first alarm signal, said first low frequency signal being mixed with said first data signal; and
   a second means for generating a second low frequency signal in said forward direction on said backward transmission channel, after said first low frequency signal is produced;
said second low frequency signal being modulated by at most (N−1) pulses and being mixed with said first data signal on said backward transmission channel when a forward transmission regenerative repeater is connected to a backward transmission regenerative repeater;
said forward transmission regenerative repeater of each said regenerative repeater pair comprising:
   means for detecting said first low frequency signal, and
   means for transmitting said first low frequency signal on said forward transmission channel to the next forward transmission regenerative repeater; and said backward transmission regenerative repeater of each said regenerative repeater pair comprising;
   means for detecting a first pulse of said second low frequency signal which is transmitted from the preceding backward transmission regenerative repeater in said forward direction on said backward transmission channel;
   means for connecting the output terminal of said forward transmission regenerative repeater to the input terminal of said backward transmission regenerative repeater in response to said detection of said first low frequency signal by said first low frequency signal detecting means,
while disconnecting said input terminal of said backward transmission regenerative repeater of one pair and the output terminal of the backward transmission regenerative repeater of the next pair;
   means for disconnecting said output terminal of said forward transmission regenerative repeater of said pair from said input terminal of said backward transmission regenerative repeater of said pair in response to said detection of said first pulse of said second low frequency signal by said first pulse detection means;
while connecting said input terminal of said backward transmission regenerative repeater of said pair and said output terminal of said backward transmission regenerative repeater of the next pair; and
   means for transmitting in said backward direction on said backward transmission channel to said output terminal of said backward transmission regenerative of said next pair, only the pulses of said second low frequency signal which succeed said first detected pulse.

2. A remote locating system as claimed in claim 1, in which in each said regenerative repeater pair, said first low frequency signal detecting means and said connecting means are connected, by an opto-electronic coupler which converts said first low frequency signal to a direct current signal and which electrically insulates the two regenerative repeaters of said pair.

3. A remote locating system as claimed in claim 1 in which the first pulse detected in the backward transmission regenerative repeater of an ith regenerative repeater pair, where i is between 1 and N, is the ith pulse which is produced by said second generating means.

4. A remote locating system as claimed in claim 1 in which said low frequency signal detecting means of the forward transmission regenerative repeater of each of said regenerative repeater pairs controls the interruption of the remote supply of said connecting means, when said first generating means does not generate said first low frequency signal, and said connecting means and transmitting means of said backward transmission regenerative repeater of said regenerative repeater pair provides the disconnection between the forward and backward transmission channels in all regenerative repeater pairs.

5. A remote locating system as claimed in claim 1 in which said first alarm signal producing means produces a first alarm indication signal on the output data transmission channels of other lines which are connected to said monitoring station and said second alarm signal producing means produces a second alarm indication signal on the output data transmission channels of other lines which are connected to said monitored station in response to a transmission fault by said first or second transmission fault detecting means.

* * * * *